United States Patent
Lee et al.

(10) Patent No.: US 10,354,605 B2
(45) Date of Patent: Jul. 16, 2019

(54) LIQUID CRYSTAL DISPLAY AND METHOD FOR MANUFACTURING THE SAME

(71) Applicant: LG Display Co., Ltd., Seoul (KR)

(72) Inventors: Minjic Lee, Gyeonggi-do (KR); Seeung Lee, Gyeonggi-do (KR); Byunghyun Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 393 days.

(21) Appl. No.: 13/865,326

(22) Filed: Apr. 18, 2013

(65) Prior Publication Data

US 2014/0152938 A1    Jun. 5, 2014

(30) Foreign Application Priority Data

Nov. 30, 2012  (KR) .................. 10-2012-0138187

(51) Int. Cl.
*G02F 1/1345* (2006.01)
*G09G 3/36* (2006.01)
*G02F 1/1362* (2006.01)

(52) U.S. Cl.
CPC ....... *G09G 3/3648* (2013.01); *G02F 1/13454* (2013.01); *G02F 1/136204* (2013.01); *G02F 1/136286* (2013.01); *G02F 2001/13456* (2013.01); *G09G 3/3614* (2013.01); *G09G 2300/0426* (2013.01); *G09G 2310/0278* (2013.01); *G09G 2310/0281* (2013.01)

(58) Field of Classification Search
CPC combination set(s) only.
See application file for complete search history.

(56) References Cited

U.S. PATENT DOCUMENTS

| 7,851,996 B2 * | 12/2010 | Nakamura | H01L 27/3279 313/504 |
| 2005/0230757 A1 * | 10/2005 | Nagasawa et al. | 257/355 |
| 2007/0146245 A1 * | 6/2007 | Goden | G09G 3/325 345/76 |

(Continued)

FOREIGN PATENT DOCUMENTS

| JP | 2010-072363 A | 4/2010 |
| JP | 2011-164369 A | 8/2011 |

(Continued)

OTHER PUBLICATIONS

Korean Office Action dated May 27, 2013 for corresponding application No. KR 10-2012-0138187.

(Continued)

*Primary Examiner* — Edward J Glick
*Assistant Examiner* — Mark D Teets
(74) *Attorney, Agent, or Firm* — Morgan, Lewis & Bockius LLP

(57) ABSTRACT

A liquid crystal display and a method for manufacturing the same capable of reducing a bezel are disclosed. The liquid crystal display includes a display panel including vertical lines, horizontal lines, and pixels and a driver integrated circuit (IC) supplying a data voltage and a gate pulse to the pixels through the vertical lines. The vertical lines include vertical data lines to which the data voltage is supplied, vertical gate lines to which the gate pulse is supplied, and vertical common voltage lines to which a common voltage is supplied. The horizontal lines include horizontal gate lines which are connected to the vertical gate lines and receive the gate pulse through the vertical gate lines.

19 Claims, 14 Drawing Sheets

(56) References Cited

U.S. PATENT DOCUMENTS

| | | |
|---|---|---|
| 2008/0002126 A1* | 1/2008 | Lim et al. .................. 349/141 |
| 2009/0059110 A1* | 3/2009 | Sasaki et al. ................. 349/39 |
| 2010/0066967 A1 | 3/2010 | Takahashi et al. |
| 2010/0079692 A1* | 4/2010 | Hwang ............ G02F 1/136204 349/40 |
| 2010/0109994 A1* | 5/2010 | Lee .................. G02F 1/136286 345/98 |
| 2010/0171687 A1 | 7/2010 | Chiang et al. |
| 2011/0007257 A1* | 1/2011 | Min ................. G02F 1/136286 349/150 |
| 2011/0134104 A1 | 6/2011 | Yoon et al. |
| 2011/0194061 A1 | 8/2011 | Yoso et al. |
| 2013/0093657 A1* | 4/2013 | Song et al. .................... 345/92 |
| 2013/0113766 A1* | 5/2013 | Kim .................... G09G 3/3648 345/205 |
| 2014/0139792 A1* | 5/2014 | Zhu ...................... G02F 1/1345 349/106 |
| 2014/0375534 A1* | 12/2014 | Lee ..................... G09G 3/3648 345/87 |

FOREIGN PATENT DOCUMENTS

| | | |
|---|---|---|
| KR | 10-1997-0022455 | 5/1997 |
| KR | 10-2009-0072548 A | 7/2009 |
| KR | 10-2012-0116785 A | 10/2012 |
| KR | 10-2012-0122227 A | 11/2012 |

OTHER PUBLICATIONS

Japanese Office Action dated Jun. 17, 2014 for Japanese Patent Application No. 2013-170382.

* cited by examiner

LIQUID CRYSTAL DISPLAY AND METHOD FOR MANUFACTURING THE SAME

This application claims the benefit of Korean Patent Application No. 10-2012-0138187 filed on Nov. 30, 2012, the entire contents of which is incorporated herein by reference for all purposes as if fully set forth herein.

BACKGROUND OF THE INVENTION

Field of the Invention

Embodiments of the invention relate to a liquid crystal display and a method for manufacturing the same capable of reducing a bezel size.

Discussion of the Related Art

A field of display devices rapidly changed from large-sized cathode ray tubes (CRTs) to flat panel displays (FPDs) which have advantageous characteristics of thin profile and lightness in weight and are able to implement the large-sized screen. Examples of the flat panel displays include a liquid crystal display (LCD), a plasma display panel (PDP), an organic light emitting diode (OLED) display, and an electrophoresis display (EPD). Among the flat panel displays, the liquid crystal display controls an electric field applied to liquid crystal molecules based on a data voltage to display an image. An active matrix liquid crystal display has reduced its cost due to the development of a process technology and a driving technology and has improved its performance. Hence, the active matrix liquid crystal display has been most widely used in almost all kinds of display devices from small-sized mobile devices to large-sized televisions.

The manufactures of the liquid crystal displays have made various attempts to achieve a narrow bezel design. The narrow bezel technology minimizes a bezel size, in which an image is not displayed, at an edge of a display panel, so as to relatively increase the size of a pixel area, in which the image is displayed. In the narrow bezel technology, there is a limit to a reduction in the bezel size because of a limitation of fine process.

SUMMARY OF THE INVENTION

Embodiments of the invention provide a liquid crystal display and a method for manufacturing the same capable of reducing a bezel size.

In one aspect, there is a liquid crystal display comprising a display panel including vertical lines, horizontal lines, and pixels and a driver integrated circuit (IC) supplying a data voltage and a gate pulse to the pixels through the vertical lines.

The vertical lines include vertical data lines to which the data voltage is supplied, vertical gate lines to which the gate pulse is supplied, and vertical common voltage lines to which a common voltage is supplied. The horizontal lines include horizontal gate lines which are connected to the vertical gate lines and receive the gate pulse through the vertical gate lines.

In another aspect, there is a method for manufacturing a liquid crystal display comprising forming vertical lines and horizontal lines crossing the vertical lines on a substrate and forming a plurality of pixels on the substrate to manufacture a display panel, and connecting a driver integrated circuit (IC), which supplies a data voltage and a gate pulse to the pixels through the vertical lines, to the display panel.

In yet another aspect, there is a method for manufacturing a liquid crystal display including a display panel including vertical lines, horizontal lines, and pixels and a driver integrated circuit (IC) supplying a data voltage and a gate pulse to the pixels through the vertical lines, the method comprising forming the horizontal lines using gate metal patterns formed on a substrate of the display panel, forming a gate insulating layer on the substrate to cover the horizontal lines, stacking semiconductor patterns and source-drain metal patterns on the gate insulating layer to form the vertical lines, stacking a first passivation layer and an organic protection layer on the vertical lines and the gate insulating layer, forming a common electrode and a link pattern of the pixels formed of a transparent conductive material on the organic protection layer, forming a second passivation layer on the common electrode and the link pattern, and forming pixel electrodes of the pixels on the second passivation layer.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Names of components used in the following description are selected in consideration of ease of specification preparation, and thus may be different from names of components used in practical products.

Figure 1:
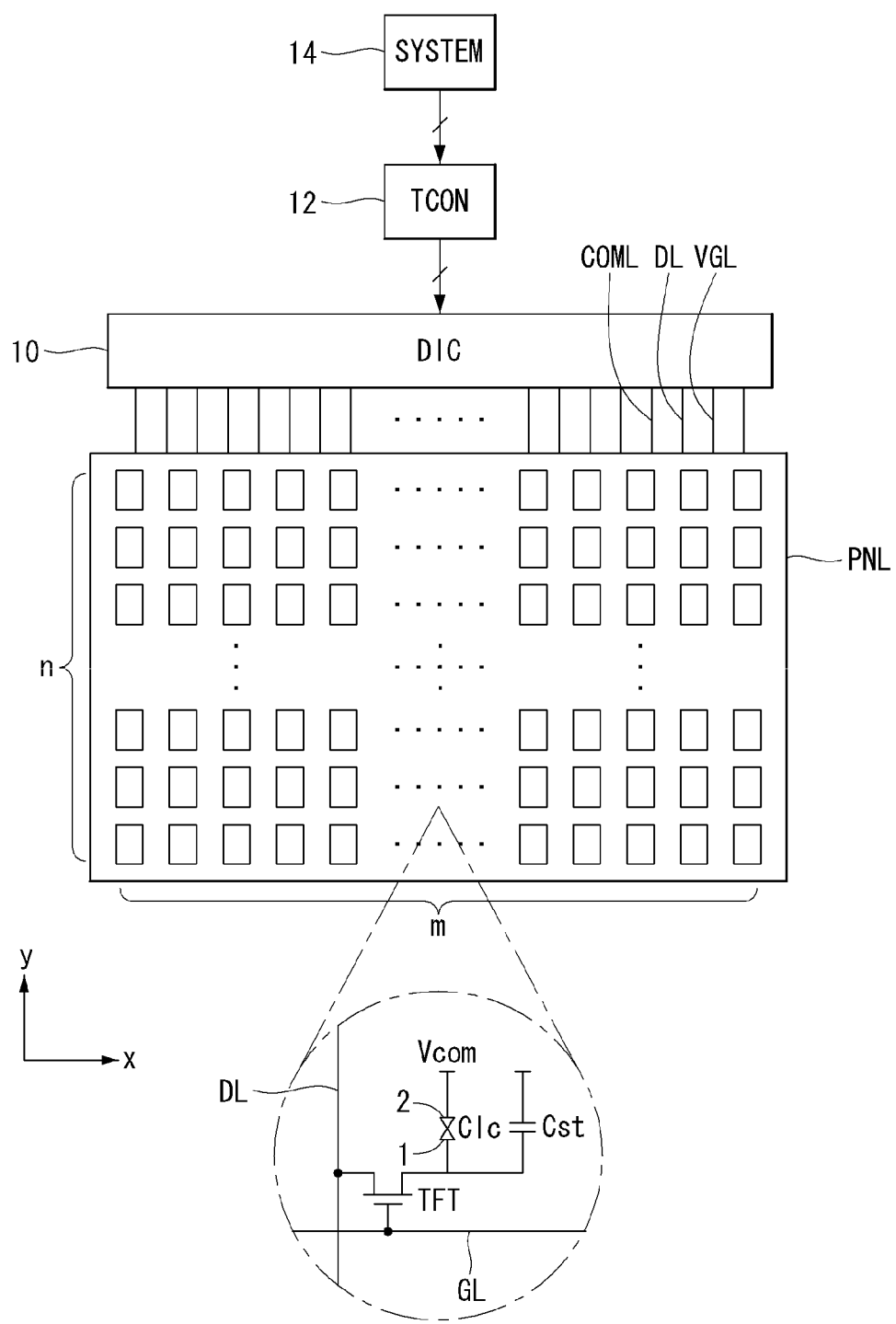
FIGS. 1 and 2 illustrate a liquid crystal display according to an example embodiment of the invention.
Figure 2:
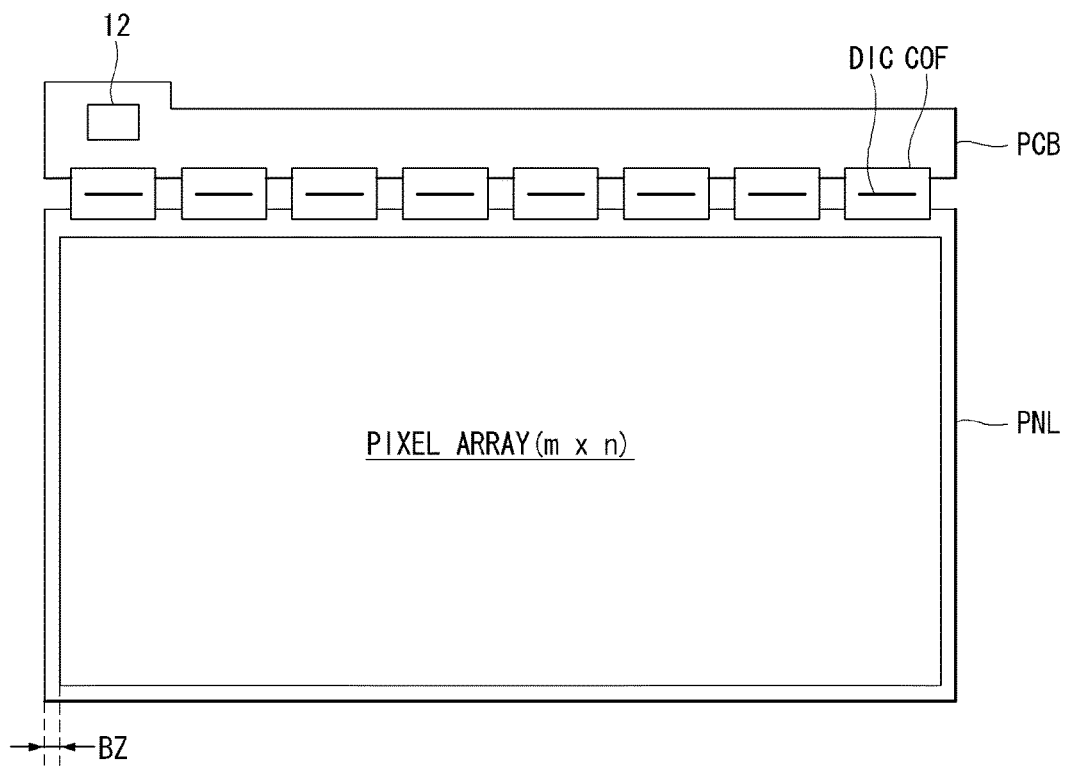
Figure 3:
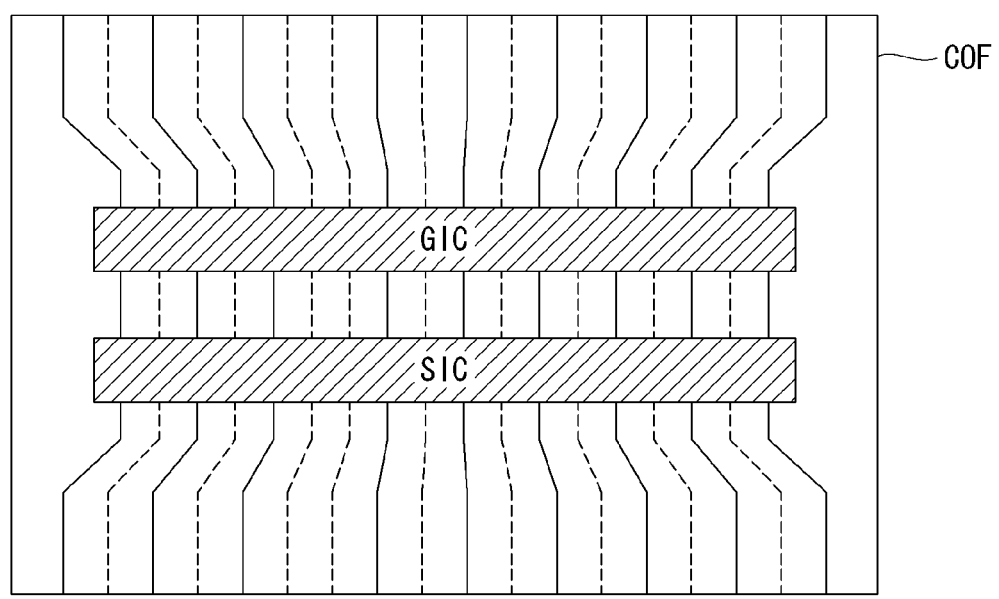
FIG. 3 is an enlarged view of a chip-on film (COF) shown in FIG. 2.

As shown in FIGS. 1 to 3, a liquid crystal display according to an example embodiment of the invention includes a display panel PNL, a driver integrated circuit (IC) DIC (or 10), a timing controller TCON (or 12), etc.

The liquid crystal display according to the embodiment of the invention may be implemented in all of know liquid crystal modes including a twisted nematic (TN) mode, a vertical alignment (VA) mode, an in-plane switching (IPS) mode, a fringe field switching (FFS) mode, etc. Further, the liquid crystal display according to the embodiment of the invention may be implemented as any type liquid crystal display including a transmissive liquid crystal display, a transflective liquid crystal display, and a reflective liquid crystal display.

The display panel PNL includes an upper substrate and a lower substrate positioned on opposite sides of liquid crystal cells Clc. Video data of the display panel PNL is displayed in an area of a pixel array including pixels arranged in a matrix form. The pixel array includes a thin film transistor (TFT) array formed on the lower substrate of the display panel PNL and a color filter array formed on the upper substrate of the display panel PNL. The TFT array includes vertical lines and horizontal lines. The vertical lines are formed along a vertical direction (i.e., a y-axis direction of FIG. 1) of the display panel PNL. The horizontal lines are formed along a horizontal direction (i.e., an x-axis direction of FIG. 1) of the display panel PNL and cross the vertical lines at right angles. The vertical lines include vertical data lines DL, vertical common voltage lines COML, and vertical gate lines VGL. The vertical common voltage lines COML receive a common voltage Vcom from a power supply circuit (not shown). The horizontal lines include horizontal gate lines GL receiving a gate pulse through the vertical gate lines VGL. The horizontal gate lines GL are respectively connected to the vertical gate lines VGL and receive the gate pulse through the vertical gate lines VGL.

A thin film transistor (TFT) is formed at each of crossings between the vertical data lines DL and the horizontal gate lines GL of the TFT array. The TFT supplies a data voltage from the vertical data line DL to a pixel electrode 1 of the liquid crystal cell Clc in response to the gate pulse from the horizontal gate line GL. Each of the liquid crystal cells Clc is driven by a voltage difference between the pixel electrode 1 charged to the data voltage through the TFT and a common electrode 2, to which the common voltage Vcom is applied. The common voltage Vcom is applied to the common electrodes (denoted by 'COM' in FIGS. 8 and 9) of all the pixels through the vertical common voltage lines COML assigned to some of the vertical lines. A storage capacitor Cst is connected to each of the liquid crystal cells Clc and uniformly holds voltage of the liquid crystal cell Clc during one frame period. The color filter array includes color filters and black matrixes. Polarizing plates are respectively attached to the upper and lower substrates of the display panel PNL. Alignment layers for setting a pre-tilt angle of liquid crystals are respectively formed on the upper and lower substrates of the display panel PNL.

The driver IC 10 includes a plurality of source driver ICs SIC and a plurality of gate driver ICs GIC. As shown in FIG. 3, the source driver ICs SIC and the gate driver ICs GIC are mounted on a flexible printed circuit board (FPCB), for example, a chip-on film (COF). Both the source driver ICs SIC and the gate driver ICs GIC are mounted on one COF. An input terminal of the COF is bonded to a printed circuit board (PCB), and an output terminal of the COF is bonded to the lower substrate of the display panel PNL. The COF includes an insulating layer between lines (denoted by dotted lines in FIG. 3) connected to the source driver ICs SIC and lines (denoted by solid lines in FIG. 3) connected to the gate driver ICs GIC, thereby electrically separating the lines of the source driver ICs SIC and the lines of the gate driver ICs GIC from each other.

Each of the source driver ICs SIC samples digital video data of an input image and then latches the digital video data under the control of the timing controller 12, thereby converting the digital video data into parallel data. The source driver IC SIC converts the digital video data into analog gamma compensation voltages using an analog-to-digital converter (ADC) under the control of the timing controller 12 to generate the data voltage. The source driver IC SIC then supplies the data voltage to the vertical data line DL. Each of the gate driver ICs GIC sequentially supplies the gate pulse (or scan pulse) synchronized with the data voltage to the vertical gate lines VGL under the control of the timing controller 12.

All of the driver ICs DIC are formed on the COF connected to the upper side of the display panel PNL, and the gate pulse is applied to the horizontal gate lines GL through the vertical gate lines VGL. Thus, the gate driver ICs GIC do not have to be bonded to or embedded in a left edge and a right edge of the display panel PNL. Further, routing lines for connecting the horizontal gate lines GL and the gate driver ICs GIC are not formed at the left edge and the right edge of the display panel PNL. As a result, a thickness of a bezel BZ at the left and right edges of the display panel PNL and a thickness of a bezel BZ at a lower edge of the display panel PNL may be minimized.

The timing controller 12 transmits the digital video data of the input image received from a host system 14 (or SYSTEM) to the source driver ICs SIC. The timing controller 12 receives timing signals, such as a vertical sync signal Vsync, a horizontal sync signal Hsync, a data enable signal DE and a main clock CLK, from the host system 14. The timing signals are synchronized with the digital video data of the input image. The timing controller 12 generates a source timing control signal for controlling operation timing of the source driver ICs SIC and a gate timing control signal for controlling operation timing of the gate driver ICs GIC using the timing signals Vsync, Hsync, DE and CLK.

The host system 14 may be implemented as one of a television system, a set-top box, a navigation system, a DVD player, a Blue-ray player, a personal computer (PC), a home theater system, and a phone system. The host system 14 converts the digital video data of the input image into a format suitable for the display panel PNL. The host system 14 transmits the digital video data of the input image and the timing signals Vsync, Hsync, DE and CLK to the timing controller 12.

Figure 4:
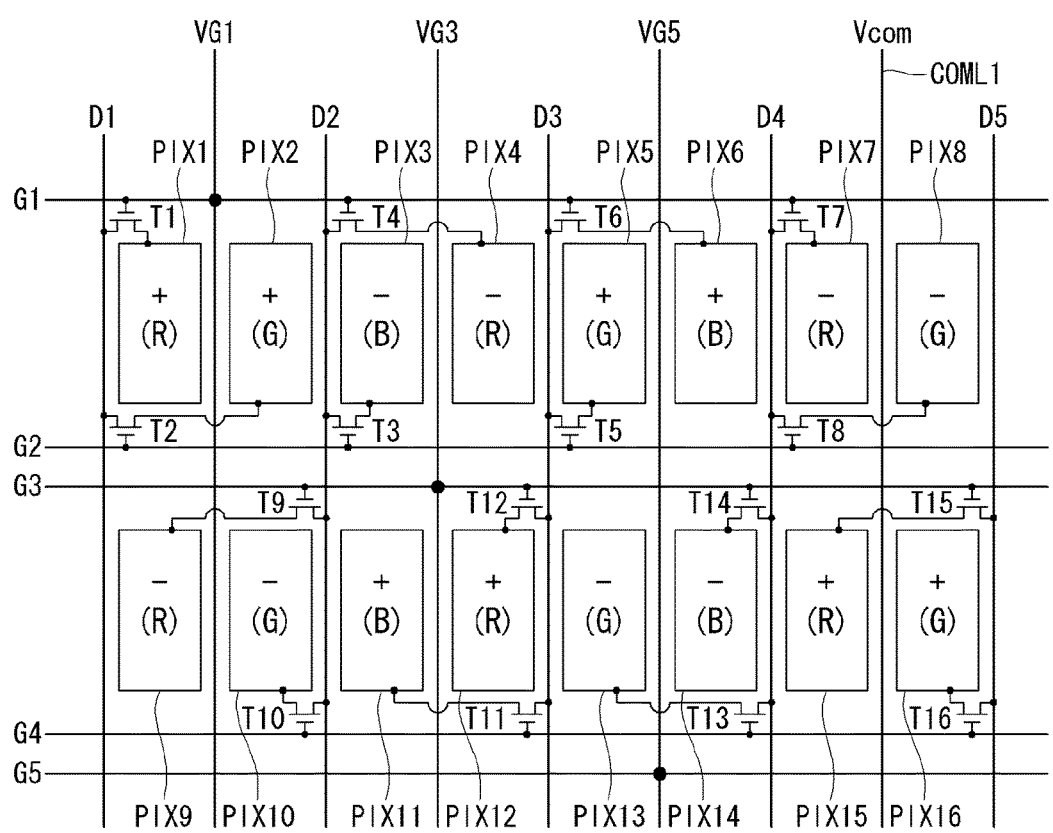
FIG. 4 partially illustrates a pixel array according to an example embodiment of the invention.

When the pixel array is configured as shown in FIG. 4, the data voltage, the common voltage, and the gate pulse may be supplied to m pixels arranged on one line of the display panel PNL through only m vertical lines, where m is a positive integer equal to or greater than 2. Thus, the embodiment of the invention may implement a resolution 'm (the number of horizontal pixels)*n/2 (the number of vertical pixels)' of the pixel array having the structure shown in FIG. 4 when the m vertical lines and n horizontal lines are formed, where n is a positive integer equal to or greater than 2.

Figure 5:
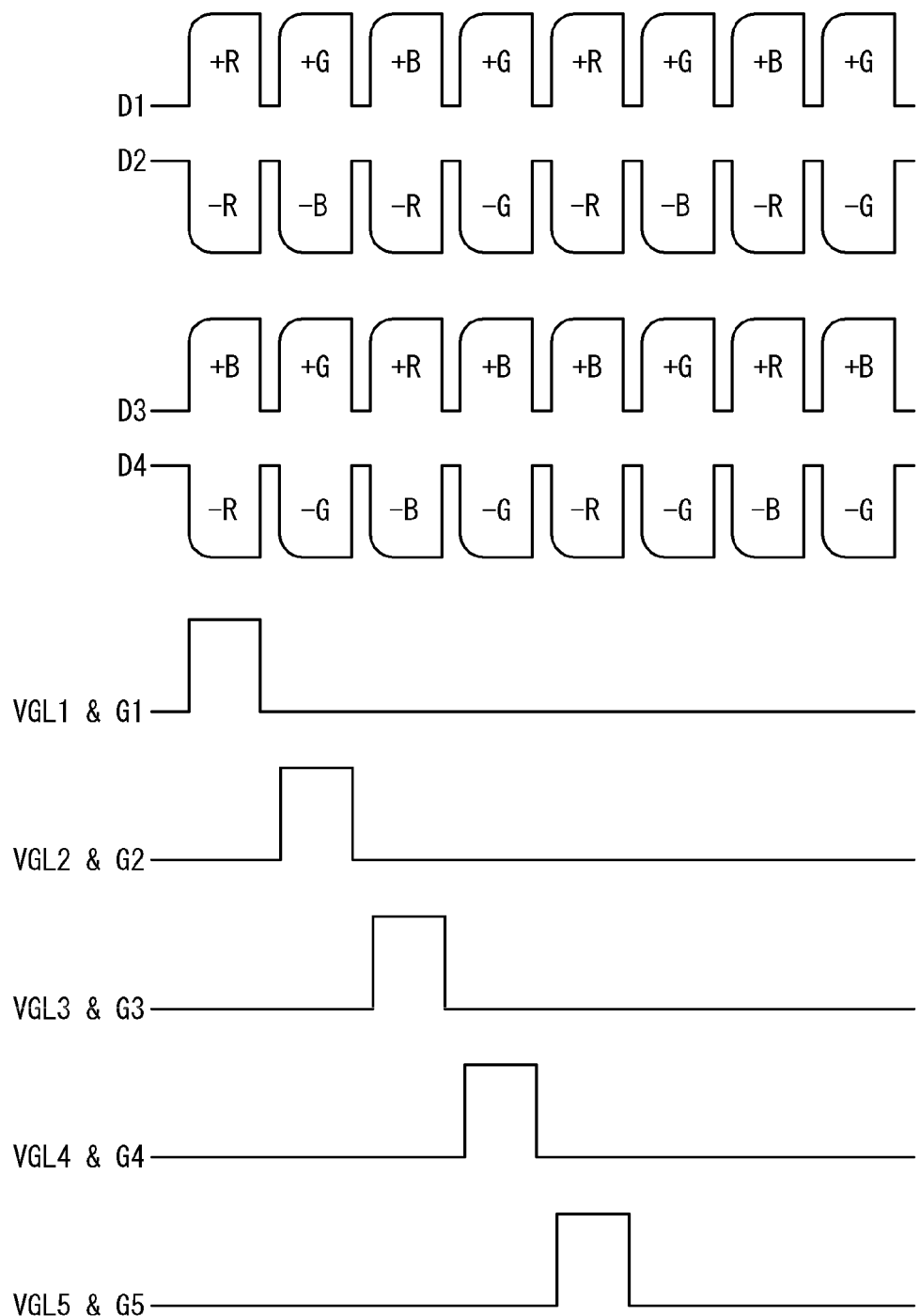
FIG. 5 illustrates a connection example between vertical gate lines and horizontal gate lines.
Figure 6:
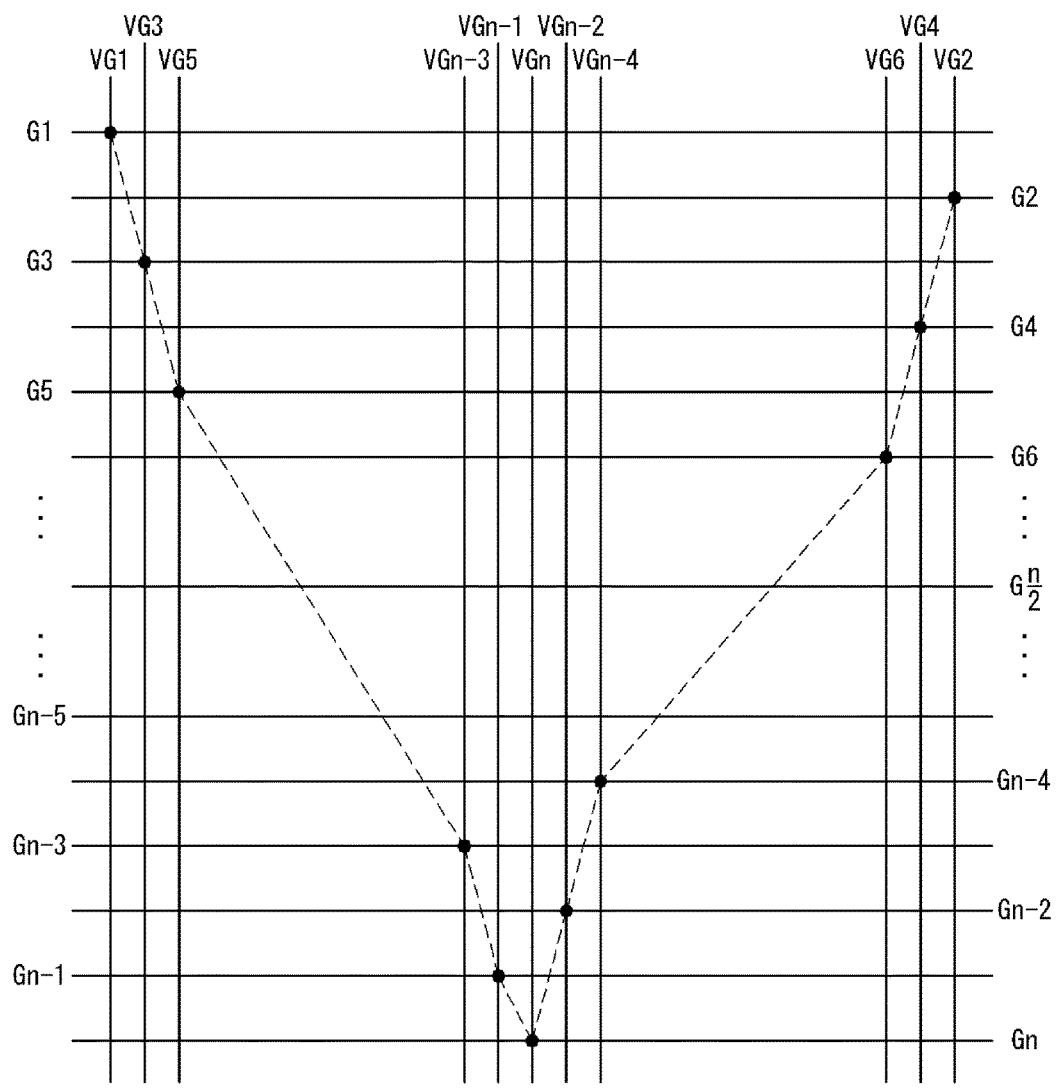
FIG. 6 illustrates an example of a data voltage and a gate pulse applied to a pixel array shown in FIG. 4.

FIG. 4 partially illustrates the pixel array according to the embodiment of the invention. FIG. 5 illustrates a connection example between the vertical gate lines and the horizontal gate lines. FIG. 6 is a waveform diagram illustrating an example of the data voltage and the gate pulse applied to the pixel array shown in FIG. 4. In FIGS. 4 to 6, "D1 to D5"

denote the vertical data lines, "VG1 to VGn" denote the vertical gate lines, "COML" denotes the vertical common voltage line, "G1 to Gn" denote the horizontal gate lines, "T1 to T16" denote the TFTs, and "PIX1 to PIX16" denote the pixel electrodes.

Figure 10:
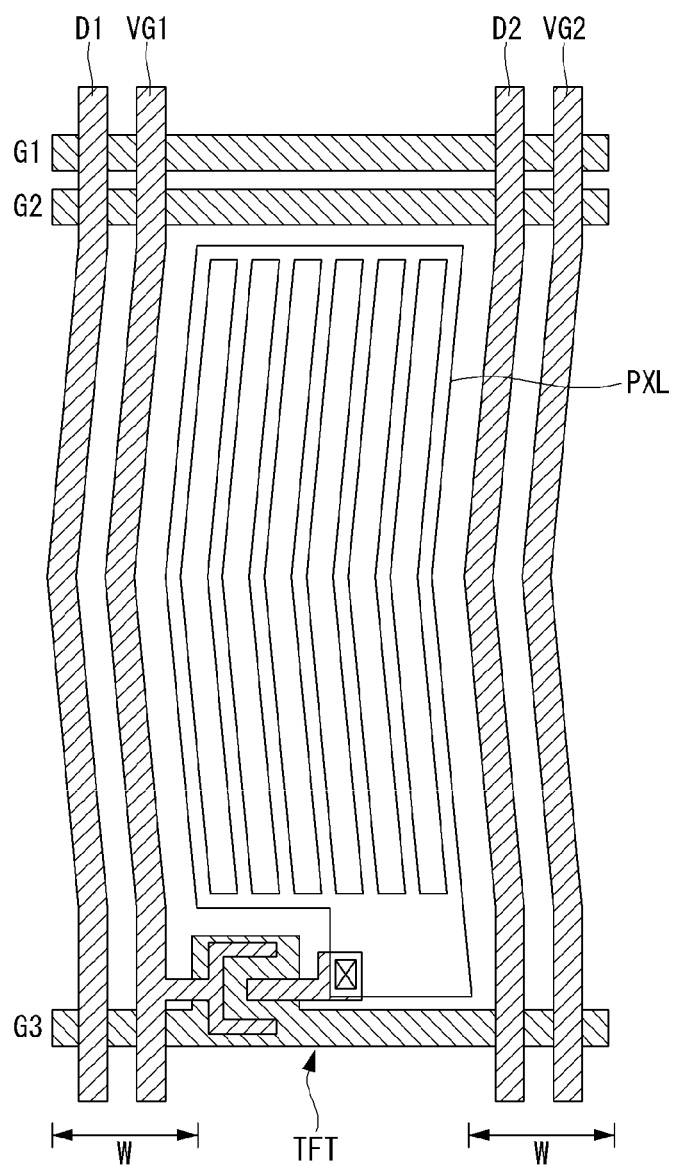
FIG. 10 illustrates an example of widening a line width of a black matrix when a vertical data line and a vertical gate line are positioned adjacent to each other.

As shown in FIGS. 4 to 6, only one vertical line exists between the pixels positioned adjacent to each other in the horizontal direction. For example, only the first vertical gate line VG1 is positioned between the horizontally adjacent first and second pixel electrodes PIX1 and PIX2. Further, only the second vertical data line D2 is positioned between the horizontally adjacent second and third pixel electrodes PIX2 and PIX3, and only the third vertical gate line VG3 is positioned between the horizontally adjacent third and fourth pixel electrodes PIX3 and PIX4. Such a method for arranging the vertical lines may reduce a width of a black matrix formed between the pixels positioned adjacent to each other in the horizontal direction. On the other hand, as shown in FIG. 10, there is a method for disposing the vertical data line and the vertical gate line in a boundary between the pixels positioned adjacent to each other in the horizontal direction. However, the method increases a width W of a black matrix, thereby reducing an aperture ratio of the pixels.

The embodiment of the invention causes the data voltage of the same polarity to be output to the vertical data lines during one frame period using the pixel array having the structure shown in FIG. 4, thereby reducing power consumption and a heat generation amount of the source driver ICs SIC and achieving dot inversion in the pixel array. Hence, the image quality of the liquid crystal display according to the embodiment of the invention is improved. The embodiment of the invention may reduce the number of vertical data lines and additionally include the vertical gate lines and the vertical common voltage lines without increasing the number of vertical lines using the pixel array having the structure shown in FIG. 4. Thus, the embodiment of the invention may supply the data voltage, the common voltage, and the gate pulse to the m pixels arranged on one horizontal line of the display panel PNL through only the m vertical lines. The embodiment of the invention may implement the resolution 'm (the number of horizontal pixels)*n/2 (the number of vertical pixels)' of the pixel array having the structure shown in FIG. 4.

For example, when the resolution of the pixel array is '5760×1080', the number of vertical data lines is 2880, a sum of the number of vertical gate lines and the number of horizontal gate lines is 2160 (=1080×2), and the number of vertical common voltage lines is 720 when the pixel array having the structure shown in FIG. 4 is used. One vertical common voltage line is disposed every eight pixels arranged on the same horizontal line. Thus, when the resolution of the pixel array is '5760×1080', a sum (i.e., the total number of vertical lines) of the number of vertical data lines, the number of vertical gate lines, and the number of vertical common voltage lines is 5760. In a pixel array having a general structure, when a resolution of the general pixel array is '5760×1080', the number of necessary vertical data lines is 5700.

As shown in FIGS. 4 and 5, the positive data voltage is supplied to the odd-numbered vertical data lines D1, D3, and D5 of the display panel PNL during an Nth frame period, where N is a positive integer. The first vertical data line D1 positioned at a left end of the display panel PNL and the vertical data line Dm positioned at a right end of the display panel PNL receive the data voltage through the same output channel of the source driver IC SIC and receive the data voltage in each horizontal period in the same manner as the other vertical data lines D2 to Dm−1. For example, the first vertical data line D1 at the left end and the vertical data line Dm at the right end are connected to each other and may be connected to a first output channel of the first source driver IC SIC. Red and green data voltages, to which red and green pixels R and G positioned at left ends of the odd-numbered horizontal lines of the display panel PNL will be charged, are supplied to the vertical data lines positioned at the left ends through the first output channel of the first source driver IC SIC. Subsequently, during a next horizontal period, green and blue data voltages, to which green and blue pixels G and B positioned at right ends of the odd-numbered horizontal lines of the display panel PNL will be charged, are supplied to the vertical data lines positioned at the right ends through the first output channel of the first source driver IC SIC.

The negative data voltage is supplied to the even-numbered vertical data lines D2 and D4 of the display panel PNL during the Nth frame period. The polarities of the data voltages applied to the vertical data lines D1 to D5 maintain the same polarity during the Nth frame period, and then are inverted in an (N+1)th frame period. Thus, because the data voltages applied to the vertical data lines D1 to D5 maintain the same polarity during one frame period, the current of the source driver ICs SIC is reduced. Hence, the power consumption and the heat generation amount of the source driver ICs SIC are greatly reduced.

The first and second pixels, which are horizontally adjacent to each other on opposite sides of the first vertical gate line VG1 on a first horizontal line of the display panel PNL, are successively charged to the data voltage of a first polarity supplied through the first vertical data line D 1. More specifically, the first pixel is charged to the data voltage of the first polarity through the first TFT T1, and then the second pixel is charged to the data voltage of the first polarity through the second TFT T2.

The first TFT T1 is formed at a crossing of the first vertical data line D1 and the first horizontal gate line G1 and is connected to the first pixel electrode PIX1. A gate electrode of the first TFT T1 is connected to the first horizontal gate line G1, and a drain electrode of the first TFT T1 is connected to the first vertical data line D1. A source electrode of the first TFT T1 is connected to the first pixel electrode PIX1. The first TFT T1 is turned on in response to a first gate pulse applied to its gate electrode through the first vertical gate line VG1 and the first horizontal gate line G1. When the first TFT T1 is turned on, the data voltage of the first polarity supplied through the first vertical data line D1 is supplied to the first pixel electrode PIX1 through the first TFT T1. The second TFT T2 is formed at a crossing of the first vertical data line D1 and the second horizontal gate line G2 and is connected to the second pixel electrode PIX2. A gate electrode of the second TFT T2 is connected to the second horizontal gate line G2, and a drain electrode of the second TFT T2 is connected to the first vertical data line D1. A source electrode of the second TFT T2 is connected to the second pixel electrode PIX2 across the first vertical gate line VG1. The second TFT T2 is turned on in response to a second gate pulse applied to its gate electrode through the second vertical gate line VG2 and the second horizontal gate line G2. When the second TFT T2 is turned on, the data voltage of the first polarity supplied through the first vertical data line D1 is supplied to the second pixel electrode PIX2 through the second TFT T2.

The third and fourth pixels, which are horizontally adjacent to each other on opposite sides of the third vertical gate line VG3 on the first horizontal line of the display panel PNL, are successively charged to the data voltage of a second polarity supplied through the second vertical data line D2. More specifically, the fourth pixel is charged to the data voltage of the second polarity through the fourth TFT T4, and then the third pixel is charged to the data voltage of the second polarity through the third TFT T3.

The third TFT T3 is formed at a crossing of the second vertical data line D2 and the second horizontal gate line G2 and is connected to the third pixel electrode PIX3. A gate electrode of the third TFT T3 is connected to the second horizontal gate line G2, and a drain electrode of the third TFT T3 is connected to the second vertical data line D2. A source electrode of the third TFT T3 is connected to the third pixel electrode PIX3. The third TFT T3 is turned on in response to the second gate pulse applied to its gate electrode through the second vertical gate line VG2 and the second horizontal gate line G2. When the third TFT T3 is turned on, the data voltage of the second polarity supplied through the second vertical data line D2 is supplied to the third pixel electrode PIX3 through the third TFT T3. The fourth TFT T4 is formed at a crossing of the second vertical data line D2 and the first horizontal gate line G1 and is connected to the fourth pixel electrode PIX4. A gate electrode of the fourth TFT T4 is connected to the first horizontal gate line G1, and a drain electrode of the fourth TFT T4 is connected to the second vertical data line D2. A source electrode of the fourth TFT T4 is connected to the fourth pixel electrode PIX4 across the third vertical gate line VG3. The fourth TFT T4 is turned on in response to the first gate pulse applied to its gate electrode through the first vertical gate line VG1 and the first horizontal gate line G1. When the fourth TFT T4 is turned on, the data voltage of the second polarity supplied through the second vertical data line D2 is supplied to the fourth pixel electrode PIX4 through the fourth TFT T4.

The fifth and sixth pixels, which are horizontally adjacent to each other on opposite sides of the fifth vertical gate line VG5 on the first horizontal line of the display panel PNL, are successively charged to the data voltage of the first polarity supplied through the third vertical data line D3. More specifically, the sixth pixel is charged to the data voltage of the first polarity through the sixth TFT T6, and then the fifth pixel is charged to the data voltage of the first polarity through the fifth TFT T5.

The fifth TFT T5 is formed at a crossing of the third vertical data line D3 and the second horizontal gate line G2 and is connected to the fifth pixel electrode PIX5. A gate electrode of the fifth TFT T5 is connected to the second horizontal gate line G2, and a drain electrode of the fifth TFT T5 is connected to the third vertical data line D3. A source electrode of the fifth TFT T5 is connected to the fifth pixel electrode PIX5. The fifth TFT T5 is turned on in response to the second gate pulse applied to its gate electrode through the second vertical gate line VG2 and the second horizontal gate line G2. When the fifth TFT T5 is turned on, the data voltage of the first polarity supplied through the third vertical data line D3 is supplied to the fifth pixel electrode PIX5 through the fifth TFT T5. The sixth TFT T6 is formed at a crossing of the third vertical data line D3 and the first horizontal gate line G1 and is connected to the sixth pixel electrode PIX6. A gate electrode of the sixth TFT T6 is connected to the first horizontal gate line G1, and a drain electrode of the sixth TFT T6 is connected to the third vertical data line D3. A source electrode of the sixth TFT T6 is connected to the sixth pixel electrode PIX6 across the fifth vertical gate line VG5. The sixth TFT T6 is turned on in response to the first gate pulse applied to its gate electrode through the first vertical gate line VG1 and the first horizontal gate line G1. When the sixth TFT T6 is turned on, the data voltage of the first polarity supplied through the third vertical data line D3 is supplied to the sixth pixel electrode PIX6 through the sixth TFT T6.

The seventh and eighth pixels, which are horizontally adjacent to each other on opposite sides of the first vertical common voltage line COML1 on the first horizontal line of the display panel PNL, are successively charged to the data voltage of the second polarity supplied through the fourth vertical data line D4. More specifically, the seventh pixel is charged to the data voltage of the second polarity through the seventh TFT T7, and then the eighth pixel is charged to the data voltage of the second polarity through the eighth TFT T8.

The seventh TFT T7 is formed at a crossing of the fourth vertical data line D4 and the first horizontal gate line G1 and is connected to the seventh pixel electrode PIX7. A gate electrode of the seventh TFT T7 is connected to the first horizontal gate line G1, and a drain electrode of the seventh TFT T7 is connected to the fourth vertical data line D4. A source electrode of the seventh TFT T7 is connected to the seventh pixel electrode PIX7. The seventh TFT T7 is turned on in response to the first gate pulse applied to its gate electrode through the first vertical gate line VG1 and the first horizontal gate line G1. When the seventh TFT T7 is turned on, the data voltage of the second polarity supplied through the fourth vertical data line D4 is supplied to the seventh pixel electrode PIX7 through the seventh TFT T7. The eighth TFT T8 is formed at a crossing of the fourth vertical data line D4 and the second horizontal gate line G2 and is connected to the eighth pixel electrode PIX8. A gate electrode of the eighth TFT T8 is connected to the second horizontal gate line G2, and a drain electrode of the eighth TFT T8 is connected to the fourth vertical data line D4. A source electrode of the eighth TFT T8 is connected to the eighth pixel electrode PIX8 across the first vertical common voltage line COML1. The eighth TFT T8 is turned on in response to the second gate pulse applied to its gate electrode through the second vertical gate line VG2 and the second horizontal gate line G2. When the eighth TFT T8 is turned on, the data voltage of the second polarity supplied through the fourth vertical data line D4 is supplied to the eighth pixel electrode PIX8 through the eighth TFT T8.

The ninth and tenth pixels, which are horizontally adjacent to each other on opposite sides of the first vertical gate line VG1 on a second horizontal line of the display panel PNL, are successively charged to the data voltage of the second polarity supplied through the second vertical data line D2. More specifically, the ninth pixel is charged to the data voltage of the second polarity through the ninth TFT T9, and then the tenth pixel is charged to the data voltage of the second polarity through the tenth TFT T10.

The ninth TFT T9 is formed at a crossing of the second vertical data line D2 and the third horizontal gate line G3 and is connected to the ninth pixel electrode PIX9. A gate electrode of the ninth TFT T9 is connected to the third horizontal gate line G3, and a drain electrode of the ninth TFT T9 is connected to the second vertical data line D2. A source electrode of the ninth TFT T9 is connected to the ninth pixel electrode PIX9 across the first vertical gate line VG1. The ninth TFT T9 is turned on in response to a third gate pulse applied to its gate electrode through the third vertical gate line VG3 and the third horizontal gate line G3. When the ninth TFT T9 is turned on, the data voltage of the second polarity supplied through the second vertical data line D2 is supplied to the ninth pixel electrode PIX9 through the ninth TFT T9. The tenth TFT T10 is formed at a crossing of the second vertical data line D2 and the fourth horizontal gate line G4 and is connected to the tenth pixel electrode PIX10. A gate electrode of the tenth TFT T10 is connected to the fourth horizontal gate line G4, and a drain electrode of the tenth TFT T10 is connected to the second vertical data line D2. A source electrode of the tenth TFT T10 is connected to the tenth pixel electrode PIX10. The tenth TFT T10 is turned on in response to a fourth gate pulse applied to its gate electrode through the fourth vertical gate line VG4 and the fourth horizontal gate line G4. When the tenth TFT T10 is turned on, the data voltage of the second polarity supplied through the second vertical data line D2 is supplied to the tenth pixel electrode PIX10 through the tenth TFT T10.

The eleventh and twelfth pixels, which are horizontally adjacent to each other on opposite sides of the third vertical gate line VG3 on the second horizontal line of the display panel PNL, are successively charged to the data voltage of the first polarity supplied through the third vertical data line D3. More specifically, the twelfth pixel is charged to the data voltage of the first polarity through the twelfth TFT T12, and then the eleventh pixel is charged to the data voltage of the first polarity through the eleventh TFT T11.

The eleventh TFT T11 is formed at a crossing of the third vertical data line D3 and the fourth horizontal gate line G4 and is connected to the eleventh pixel electrode PIX11. A gate electrode of the eleventh TFT T11 is connected to the fourth horizontal gate line G4, and a drain electrode of the eleventh TFT T11 is connected to the third vertical data line D3. A source electrode of the eleventh TFT T11 is connected to the eleventh pixel electrode PIX11 across the third vertical gate line VG3. The eleventh TFT T11 is turned on in response to the fourth gate pulse applied to its gate electrode through the fourth vertical gate line VG4 and the fourth horizontal gate line G4. When the eleventh TFT T11 is turned on, the data voltage of the first polarity supplied through the third vertical data line D3 is supplied to the eleventh pixel electrode PIX11 through the eleventh TFT T11. The twelfth TFT T12 is formed at a crossing of the third vertical data line D3 and the third horizontal gate line G3 and is connected to the twelfth pixel electrode PIX12. A gate electrode of the twelfth TFT T12 is connected to the third horizontal gate line G3, and a drain electrode of the twelfth TFT T12 is connected to the third vertical data line D3. A source electrode of the twelfth TFT T12 is connected to the twelfth pixel electrode PIX12. The twelfth TFT T12 is turned on in response to the third gate pulse applied to its gate electrode through the third vertical gate line VG3 and the third horizontal gate line G3. When the twelfth TFT T12 is turned on, the data voltage of the first polarity supplied through the third vertical data line D3 is supplied to the twelfth pixel electrode PIX12 through the twelfth TFT T12.

The thirteenth and fourteenth pixels, which are horizontally adjacent to each other on opposite sides of the fifth vertical gate line VG5 on the second horizontal line of the display panel PNL, are successively charged to the data voltage of the second polarity supplied through the fourth vertical data line D4. More specifically, the fourteenth pixel is charged to the data voltage of the second polarity through the fourteenth TFT T14, and then the thirteenth pixel is charged to the data voltage of the second polarity through the thirteenth TFT T13.

The thirteenth TFT T13 is formed at a crossing of the fourth vertical data line D4 and the fourth horizontal gate line G4 and is connected to the thirteenth pixel electrode PIX13. A gate electrode of the thirteenth TFT T13 is connected to the fourth horizontal gate line G4, and a drain electrode of the thirteenth TFT T13 is connected to the fourth vertical data line D4. A source electrode of the thirteenth TFT T13 is connected to the thirteenth pixel electrode PIX13 across the fifth vertical gate line VG5. The thirteenth TFT T13 is turned on in response to the fourth gate pulse applied to its gate electrode through the fourth vertical gate line VG4 and the fourth horizontal gate line G4. When the thirteenth TFT T13 is turned on, the data voltage of the second polarity supplied through the fourth vertical data line D4 is supplied to the thirteenth pixel electrode PIX13 through the thirteenth TFT T13. The fourteenth TFT T14 is formed at a crossing of the fourth vertical data line D4 and the third horizontal gate line G3 and is connected to the fourteenth pixel electrode PIX14. A gate electrode of the fourteenth TFT T14 is connected to the third horizontal gate line G3, and a drain electrode of the fourteenth TFT T14 is connected to the fourth vertical data line D4. A source electrode of the fourteenth TFT T14 is connected to the fourteenth pixel electrode PIX14. The fourteenth TFT T14 is turned on in response to the third gate pulse applied to its gate electrode through the third vertical gate line VG3 and the third horizontal gate line G3. When the fourteenth TFT T14 is turned on, the data voltage of the second polarity supplied through the fourth vertical data line D4 is supplied to fourteenth pixel electrode PIX14 through the fourteenth TFT T14.

The fifteenth and sixteenth pixels, which are horizontally adjacent to each other on opposite sides of the first vertical common voltage line COML1 on the second horizontal line of the display panel PNL, are successively charged to the data voltage of the first polarity supplied through the fifth vertical data line D5. More specifically, the fifteenth pixel is charged to the data voltage of the first polarity through the fifteenth TFT T15, and then the sixteenth pixel is charged to the data voltage of the first polarity through the sixteenth TFT T16.

The fifteenth TFT T15 is formed at a crossing of the fifth vertical data line D5 and the third horizontal gate line G3 and is connected to the fifteenth pixel electrode PIX15. A gate electrode of the fifteenth TFT T15 is connected to the third horizontal gate line G3, and a drain electrode of the fifteenth TFT T15 is connected to the fifth vertical data line D5. A source electrode of the fifteenth TFT T15 is connected to the fifteenth pixel electrode PIX15 across the first vertical common voltage line COML1. The fifteenth TFT T15 is turned on in response to the third gate pulse applied to its gate electrode through the third vertical gate line VG3 and the third horizontal gate line G3. When the fifteenth TFT T15 is turned on, the data voltage of the first polarity supplied through the fifth vertical data line D5 is supplied to the fifteenth pixel electrode PIX15 through the fifteenth TFT T15. The sixteenth TFT T16 is formed at a crossing of the fifth vertical data line D5 and the fourth horizontal gate line G4 and is connected to the sixteenth pixel electrode PIX16. A gate electrode of the sixteenth TFT T16 is connected to the fourth horizontal gate line G4, and a drain electrode of the sixteenth TFT T16 is connected to the fifth vertical data line D5. A source electrode of the sixteenth TFT T16 is connected to the sixteenth pixel electrode PIX16. The sixteenth TFT T16 is turned on in response to the fourth gate pulse applied to its gate electrode through the fourth vertical gate line VG4 and the fourth horizontal gate line G4. When the sixteenth TFT T16 is turned on, the data voltage of the first polarity supplied through the fifth vertical data line D5 is supplied to the sixteenth pixel electrode PIX16 through the sixteenth TFT T16.

In the pixel structure shown in FIG. 4, a charge time of the data voltage is further reduced, and a sum of a resistance length of the vertical gate line and a resistance length of the horizontal gate line further increases, compared to the general pixel structure. Therefore, RC of the pixel structure shown in FIG. 4 may increase, where R is a resistance and C is a capacitance. As shown in FIGS. 5 and 6, a connection position between the vertical gate line and the horizontal gate line varies depending on a position of the display panel PNL, so as to reduce RC delay and to compensate for a loss of a charge amount of the data voltage in consideration of an increase in the RC. In FIGS. 5 and 6, a dot portion at a crossing between the vertical gate line and the horizontal gate line is a connection portion between the vertical gate line and the horizontal gate line through a contact hole. In a left half part of the display panel PNL, the vertical gate lines VG1, VG3, . . . , and VGn−1 are connected to the odd-numbered horizontal gate lines G1, G3, . . . , and Gn−1. In a right half part of the display panel PNL, the vertical gate lines VG2, VG4, . . . , and VGn are connected to the even-numbered horizontal gate lines G2, G4, . . . , and Gn. Connection portions between the vertical gate lines VG1, VG2, . . . , and VGn and the horizontal gate lines G1, G2, . . . , and Gn are positioned close to the middle of the display panel PNL as the connection portions are far away from the driver ICs DIC. Thus, as shown in FIG. 6, when the connection portions between the vertical gate lines VG1, VG2, . . . , and VGn and the horizontal gate lines G1, G2, . . . , and Gn are connected to one another, the connection portions have a V-shape. The gate driver ICs GIC start to apply the gate pulse to the first and second vertical gate lines VG1 and VG2 respectively positioned at the left and right ends of the display panel PNL and shift the gate pulse to the nth vertical gate line VGn positioned in the middle of the display panel PNL in application order of the vertical gate lines shown in FIG. 6.

If a pixel positioned at a lower left end of the display panel PNL receives the gate pulse through a connection portion formed at a lower right end of the display panel PNL, the RC delay of the gate pulse may increase because the line passing through the connection portion has a maximum length. Hence, the charge amount of the pixel may decrease. On the other hand, in the embodiment of the invention, the pixel positioned at the lower left end of the display panel PNL receives the gate pulse through a connection portion formed in the lower middle of the display panel PNL, and thus a length of the line passing through the connection portion decreases. Hence, the RC delay of the gate pulse relatively decreases, and the charge amount of the pixel increases.

The IPS mode and the FFS mode have the advantage in being able to achieve a viewing angle. In the IPS mode, because the pixel electrode and the common electrode are separated from each other on the same horizontal plane, a horizontal electric field is formed between the pixel electrode and the common electrode. Further, in the IPS mode, because the horizontal electric field is not formed in a space occupied by the pixel electrode and the common electrode, a non-driving area of liquid crystals exists. Hence, there is a loss in an aperture ratio, a luminance, a contrast, etc. On the other hand, in the FFS mode, both the common electrode COM and the pixel electrode PXL are formed on the lower substrate of the display panel PNL. In this instance, the common electrode COM and the pixel electrode PXL form a stepped profile while overlapping each other. Thus, in the FFS mode, the common electrode COM and the pixel electrode PXL greatly increase a formation area of the horizontal electric field in a pixel area using a fringe field. Hence, the aperture ratio, the luminance, and the contrast in the FFS mode may be further improved than those in the IPS mode.

Figure 7:
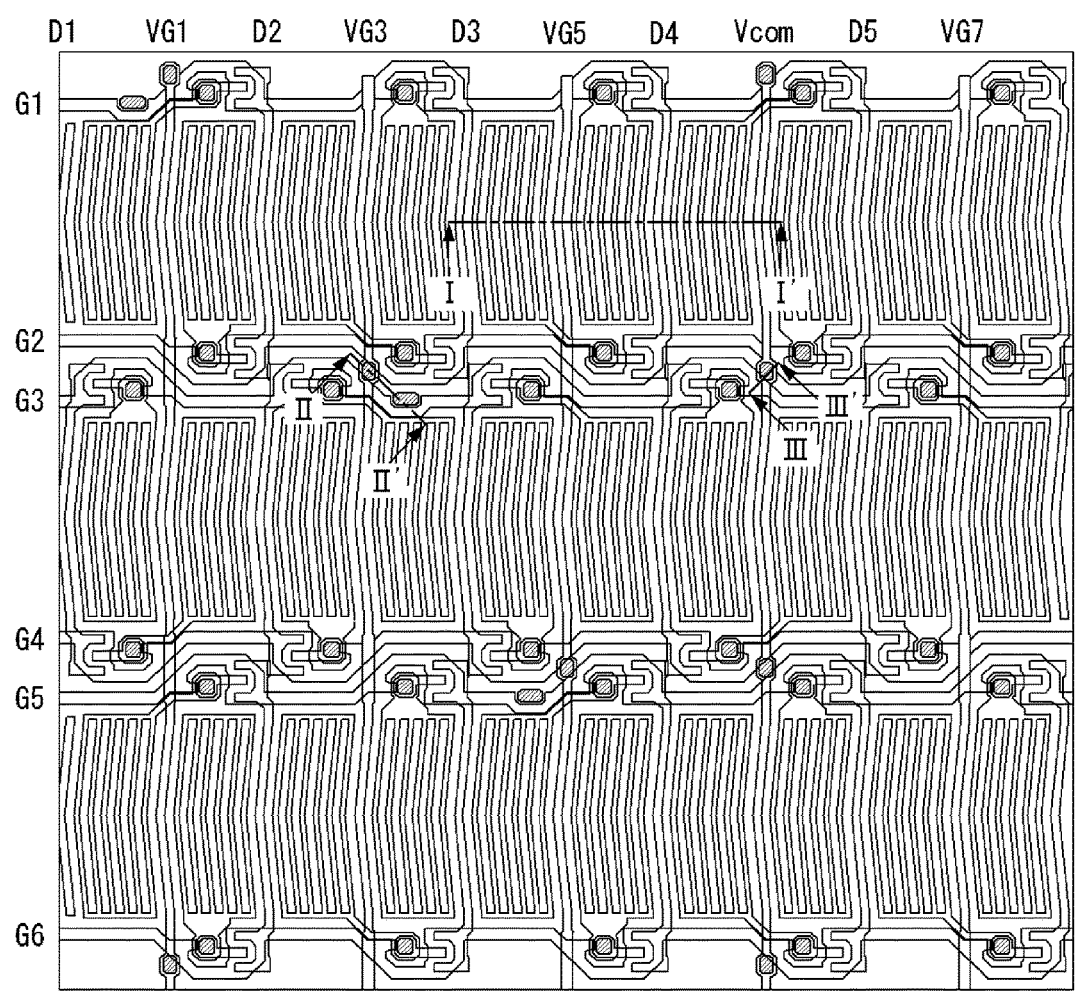
FIG. 7 is a plane view showing an example of a structure of a thin film transistor (TFT) array of a fringe field switching (FFS) mode in a liquid crystal display according to an example embodiment of the invention.
Figure 8:
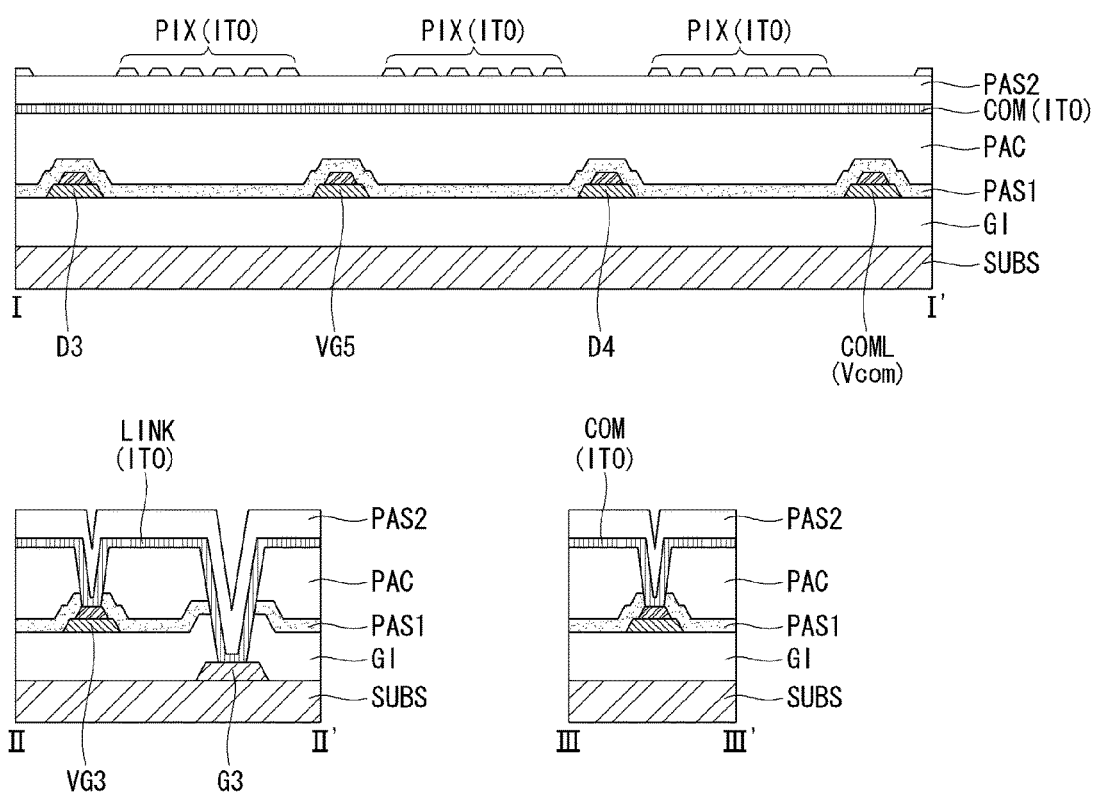
FIG. 8 is a cross-sectional view taken along lines I-I, II-II, and III-III of FIG. 7.

FIG. 7 is a plane view showing the TFT array of the FFS mode in the liquid crystal display according to the embodiment of the invention. FIG. 8 is a cross-sectional view taken along lines I-I, II-II, and III-III of FIG. 7. FIGS. 7 and 8 show the TFT array of the FFS mode as an example. However, the liquid crystal display according to the embodiment of the invention may be implemented in any liquid crystal mode, and thus is not limited to the FFS mode.

As shown in FIGS. 7 and 8, gate metal patterns are formed on a substrate SUBS. The gate metal patterns include horizontal gate lines G1 to Gn, gate pads GPAD (refer to FIGS. 9A to 9G), and data pads DPAD (refer to FIGS. 9A to 9G). The gate pads GPAD are respectively connected to vertical gate lines VG1 to VGn through contact holes and are respectively connected to output terminals of the gate driver ICs GIC. The gate pulse output from the gate driver ICs GIC are applied to the vertical gate lines VG1 to VGn and the horizontal gate lines G1 to Gn through the gate pads GPAD. The data pads DPAD are respectively connected to vertical data lines D1 to Dm through the contact holes and are respectively connected to output terminals of the source driver ICs SIC. The data voltage output from the source driver ICs SIC are applied to the vertical data lines D1 to Dm through the data pads DPAD.

A gate insulating layer GI is formed on the gate metal patterns, and a semiconductor active pattern is formed on the gate insulating layer GI. Source-drain metal patterns are formed on the semiconductor active pattern. The semiconductor active pattern and the source-drain metal patterns are simultaneously patterned and are stacked in the same shape. The source-drain metal patterns include vertical data lines D3 and D4 (refer to FIG. 8), vertical gate lines VG5 (refer to FIG. 8), and vertical common voltage lines COML (refer to FIG. 8).

A first passivation layer PAS1 is formed on the gate insulating layer GI so that it covers the source-drain metal patterns, and a thick organic protection layer PAC is formed on the first passivation layer PAS1. The organic protection layer PAC may be formed of photo acryl. If the source-drain metal pattern is shifted, a deviation may be generated in gate-source capacitances Cgs of the pixels. Thus, there may be a difference between gate-source capacitances Cgs of the left and right pixels of the vertical common voltage line COML and between gate-source capacitances Cgs of the left and right pixels of the vertical gate line. In this instance, because kickback voltages ΔVp of the horizontally adjacent pixels are different from each other, there may be a difference in brightness of the horizontally adjacent pixels even if the same data voltage is applied to the horizontally adjacent pixels. Because the organic protection layer PAC has a low dielectric constant and is thick, the deviation between the gate-source capacitances Cgs of the pixels may be reduced if the organic protection layer PAC is formed between the gate metal patterns and the pixel electrodes. The first passivation layer PAS1 is formed by thinly forming an inorganic insulating layer formed of, for example, silicon nitride (SiNx). Because a leakage current is generated when the organic protection layer PAC and the semiconductor active pattern directly contact each other, the first passivation layer PAS1 is formed between the organic protection layer PAC and the semiconductor active pattern to thereby block the leakage current.

Transparent electrode patterns are formed on the organic protection layer PAC. The transparent electrode patterns are formed of a transparent conductive material such as indium tin oxide (ITO) and include a common electrode COM(ITO) and a link pattern LINK(ITO). The common voltage Vcom is supplied to the common electrode COM(ITO) through the vertical common voltage lines COML. The common electrode COM(ITO) passes through the organic protection layer PAC and the first passivation layer PAS1 and is connected to the vertical common voltage line COML through the contact hole exposing the vertical common voltage line COML. The common electrode COM(ITO) forms the fringe field along with pixel electrodes PIX(ITO). The link pattern LINK(ITO) is formed at the same time as the common electrode COM (ITO), but is separated from the common electrode COM (ITO). The link pattern LINK(ITO) connects the vertical gate line to the horizontal gate line through a contact hole, which passes through the organic protection layer PAC and the first passivation layer PAS1 and exposes a vertical gate line VG3 (refer to FIG. 8), and through a contact hole, which passes through the organic protection layer PAC, the first passivation layer PAS1, and the gate insulating layer GI and exposes a horizontal gate line G3 (refer to FIG. 8).

A second passivation layer PAS2 is formed on the transparent electrode patterns, and the pixel electrodes PIX(ITO) are formed using transparent electrode patterns thereon. The second passivation layer PAS2 is formed by thinly forming an inorganic insulating layer formed of, for example, silicon nitride (SiNx).

The TFT array of the FFS mode shown in FIGS. 7 and 8 may be formed using 7-mask process illustrated in FIGS. 9A to 9G. FIGS. 9A to 9G are cross-sectional views sequentially illustrating each of stages in a method for manufacturing the TFT array of the liquid crystal display according to the embodiment of the invention.

Figure 9A:
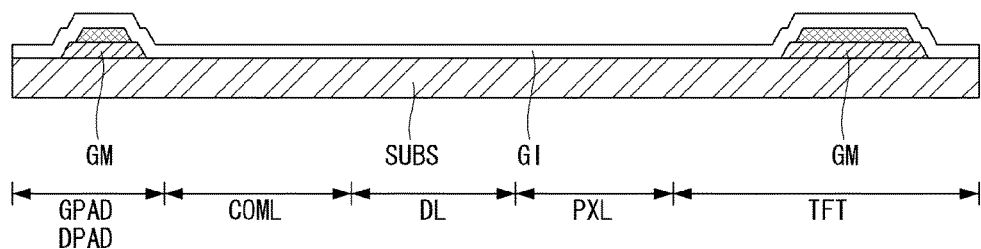
FIGS. 9A to 9G are cross-sectional views sequentially illustrating each of stages in a method for manufacturing a TFT array of a liquid crystal display according to an example embodiment of the invention.

As shown in FIG. 9A, a first mask process includes depositing a gate metal layer GM on a substrate SUBS, performing a photolithography process on the gate metal layer GM, and performing a wet etching process on a gate metal to pattern the gate metal layer GM. The gate metal may be one metal of copper (Cu), aluminum (Al), aluminum neodymium (AlNd), and molybdenum (Mo) or a double metal of Cu/MoTi. The photolithography process includes applying a photoresist on the gate metal layer GM, aligning a first photomask on the photoresist, and exposing and developing the photoresist. The gate metal layer GM is etched, and then a remaining photoresist pattern is removed using a strip process. Gate metal patterns made from the gate metal layer GM include horizontal gate lines G1 to Gn, gate pads GPAD, and data pads DPAD. A gate insulating layer GI is formed by depositing silicon nitride (SiNx) on the gate metal patterns and the substrate SUBS.

Figure 9B:
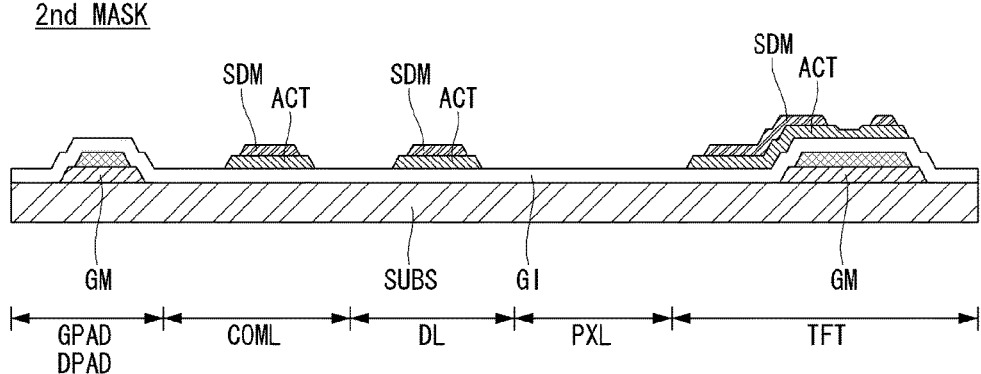

As shown in FIG. 9B, a second mask process includes successively depositing amorphous silicon (a-Si) and a source-drain metal layer SDM on the gate insulating layer GI and performing a photolithography process. A source-drain metal may be formed of one of molybdenum (Mo), aluminum neodymium (AlNd), chrome (Cr), and copper (Cu). The photolithography process includes applying a photoresist on the source-drain metal layer SDM, aligning a second photomask, i.e., a half tone mask on the photoresist, and exposing and developing the photoresist. In the photolithography process, an exposure amount of the photoresist is partially non-uniform because of the half tone mask, and thus a stepped photoresist pattern is formed. The source-drain metal is wet-etched and amorphous silicon (a-Si) is dry-etched using the stepped photoresist pattern formed through the photolithography process as a mask to form source-drain metal patterns stacked on a semiconductor active pattern ACT. The source-drain metal patterns include vertical data lines, vertical gate lines, and vertical common voltage lines. Subsequently, an ashing process is performed on the photoresist pattern to expose a semiconductor channel region of a TFT, and then the photoresist pattern is dry-etched. Hence, an ohmic contact layer exposed in the semiconductor channel region of the TFT is removed.

Figure 9C:
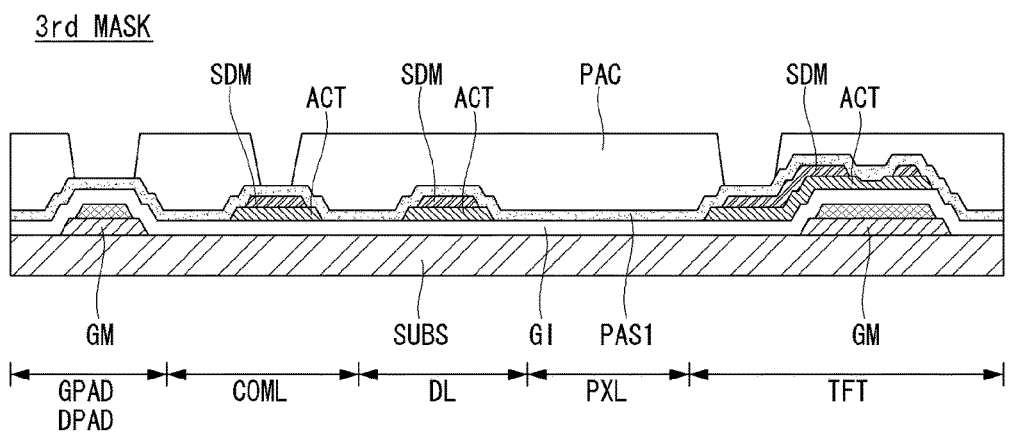

As shown in FIG. 9C, a third mask process includes depositing silicon nitride (SiNx), applying photo acryl, and performing a photolithography process. The photolithography process includes aligning a third photomask on photo acryl and exposing and developing photo acryl. As a result of the third mask process, a first passivation layer PAS1 and an organic protection layer PAC are formed. The organic protection layer PAC has contact holes for exposing the first passivation layer PAS1.

Figure 9D:
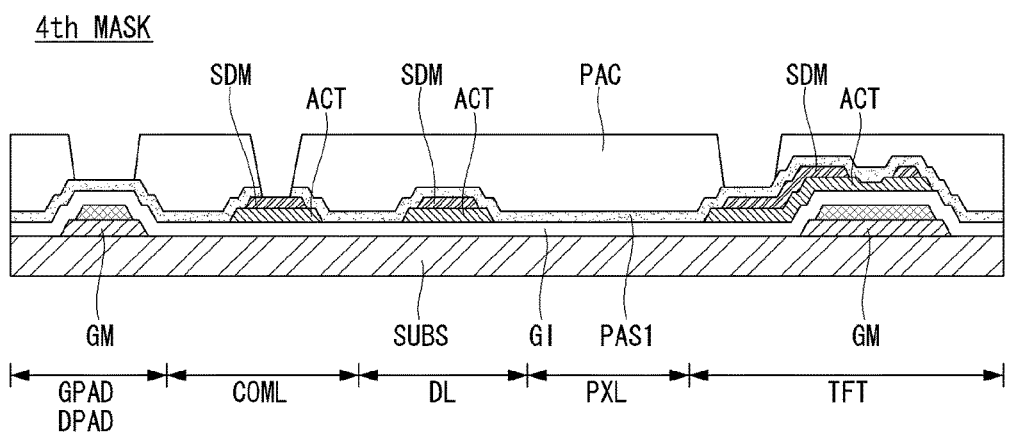

As shown in FIG. 9D, a fourth mask process includes dry etching the first passivation layer PAS1 in a state where a fourth photomask is aligned on photo acryl, and removing a first passivation material etched through a strip process. As a result of the fourth mask process, a contact hole, which passes through the organic protection layer PAC and the first passivation layer PAS1 and exposes the vertical common voltage line COML, is formed.

Figure 9E:
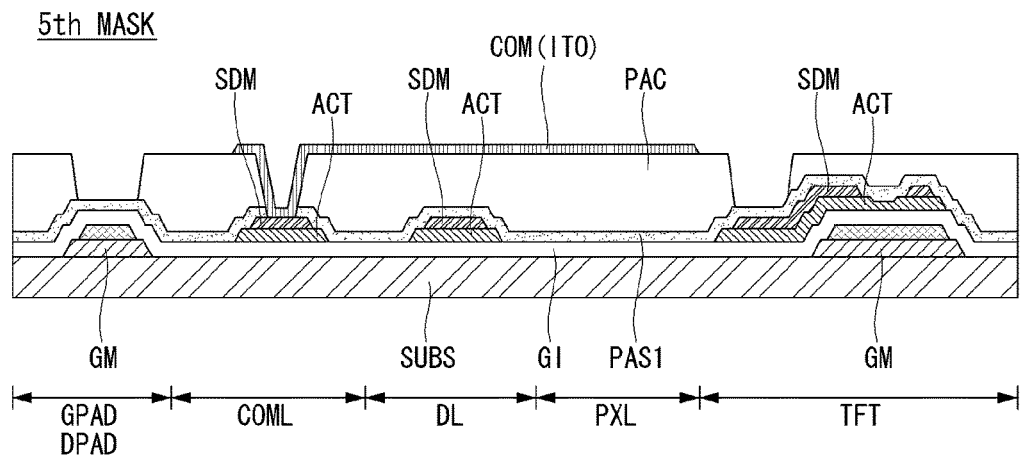

As shown in FIG. 9E, a fifth mask process includes depositing a transparent conductive material such as indium tin oxide (ITO) on the organic protection layer PAC and performing a photolithography process. The photolithography process includes applying a photoresist on indium tin oxide, aligning a fifth photomask on the photoresist, and exposing and developing the photoresist. The fifth mask process further includes wet etching indium tin oxide using a photoresist pattern formed through the photolithography process and performing a strip process on indium tin oxide. As a result, transparent electrode patterns such as a common electrode COM(ITO) and a link pattern LINK(ITO) are formed. The common electrode COM(ITO) is connected to the vertical common voltage line COML through a contact hole passing through the organic protection layer PAC and the first passivation layer PAS1.

Figure 9F:
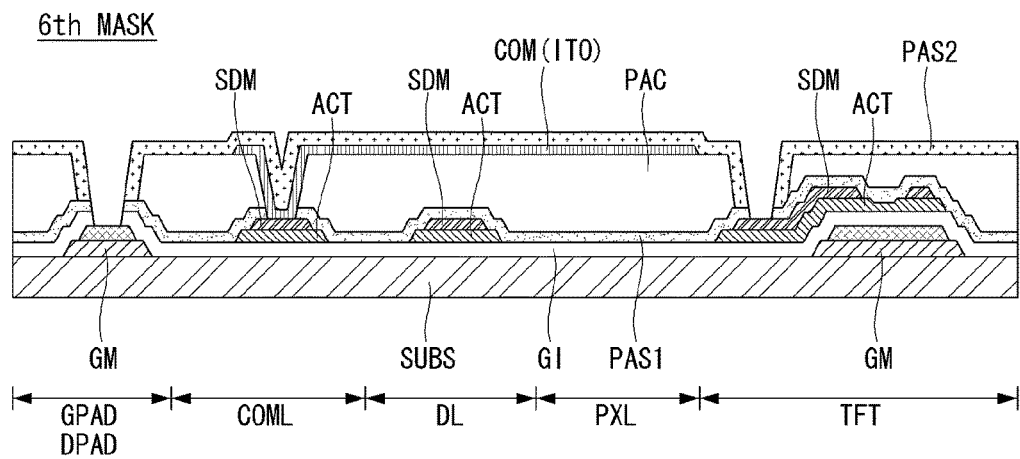

As shown in FIG. 9F, a sixth mask process includes depositing silicon nitride (SiNx) on the transparent electrode patterns and the organic protection layer PAC to form a second passivation layer PAS2 and performing a photolithography process. The photolithography process includes applying a photoresist on the second passivation layer PAS2, aligning a sixth photomask on the photoresist, and exposing and developing the photoresist. The sixth mask process further includes dry etching the second passivation layer PAS2 using a photoresist pattern formed through the photolithography process and performing a strip process on the second passivation layer PAS2. As a result, a portion of the second passivation layer PAS2 is removed, and thus the gate pad GPAD, the data pad DPAD, and contact holes exposing source electrodes of the TFTs are formed.

Figure 9G:
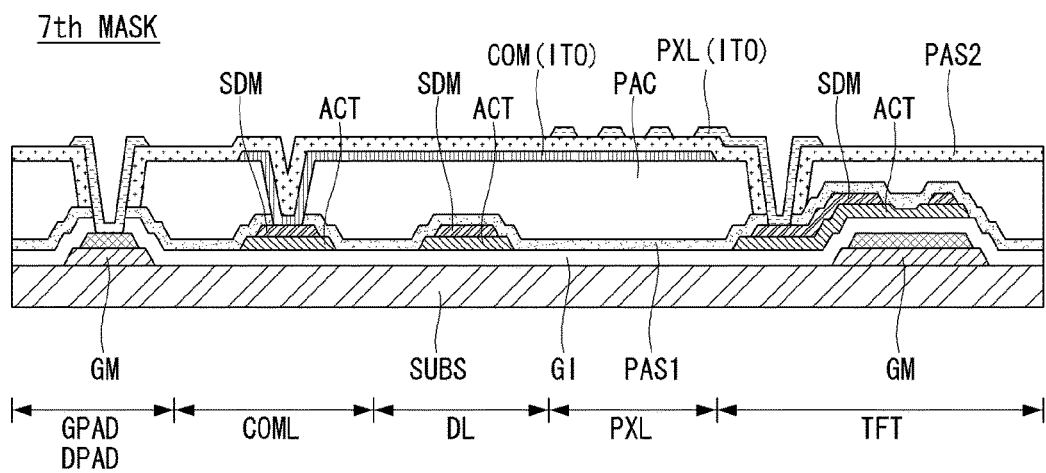

As shown in FIG. 9G, a seventh mask process includes depositing a transparent conductive material such as indium tin oxide (ITO) on the second passivation layer PAS2 and performing a photolithography process. The photolithography process includes applying a photoresist on indium tin oxide, aligning a seventh photomask on the photoresist, and exposing and developing the photoresist. The seventh mask process further includes wet etching indium tin oxide using a photoresist pattern formed through the photolithography process and performing a strip process on indium tin oxide. As a result, transparent electrode patterns including pixel electrodes PIX(ITO), pad upper electrodes, etc. are formed.

The pixel electrode PIX(ITO) is connected to the source electrode of the TFT through a contact hole passing through the second passivation layer PAS2 and the organic protection layer PAC. The pad upper electrodes are connected to gate metal patterns of the gate pad GPAD and the data pad DPAD through contact holes passing through the second passivation layer PAS2, the organic protection layer PAC, the first passivation layer PAS1, and the gate insulating layer GI.

FIGS. 9A to 9G illustrate the 7-mask process. However, the method for manufacturing the liquid crystal display according to the embodiment of the invention is not limited thereto.

Figure 11:
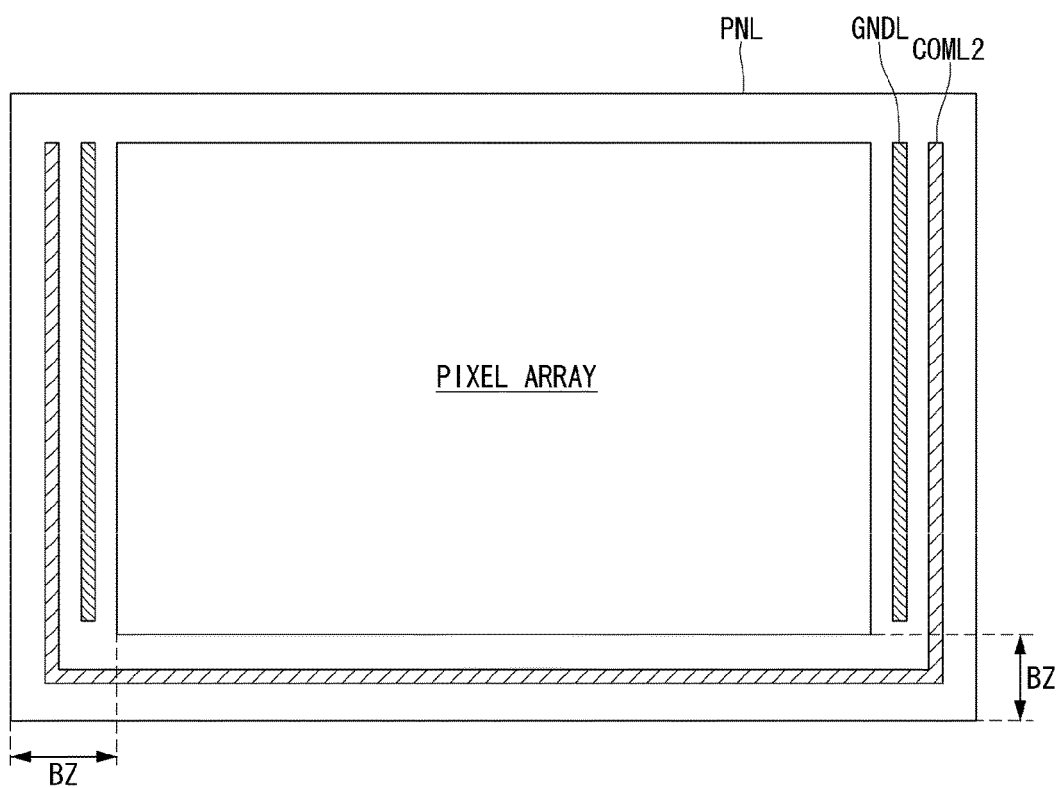
FIG. 11 illustrates an example of lines formed in a bezel in a liquid crystal display according to an example embodiment of the invention.

As described above, the embodiment of the invention supplies all of the signals required to drive the display panel through the vertical lines including the vertical data lines, the vertical gate lines, and the vertical common voltage lines. As a result, the embodiment of the invention may reduce the width of the bezel on the left, right, and lower sides of the display panel to about 1.0 mm or less. As shown in FIG. 11, one common voltage line COML2 and one ground line GNDL may be formed inside the bezel BZ. The common voltage line COML2 and the ground line GNDL may be formed using the gate metal pattern and the source-drain metal pattern. Lines other than the common voltage line COML2 and the ground line GNDL are not formed inside the bezel BZ. In FIG. 11, the common voltage Vcom is supplied to the common voltage line COML2, and a ground level voltage, for example, zero volt may be applied to the ground line GNDL. The common voltage line COML2 and the ground line GNDL are connected to one end and the other end of the vertical data line through an electrostatic circuit (not shown) and are installed for the prevention of static electricity. When static electricity is generated in the pixel array of the display panel PNL, the static electricity passes through the electrostatic circuit and is discharged through the common voltage line COML2 and the ground line GNDL formed in the bezel BZ. The common voltage line COML2 formed in the bezel BZ is connected to the vertical common voltage line COML inside the pixel array and supplies the common voltage Vcom to the common electrodes 2 of the pixels on the lower side of the pixel array, thereby supplying the uniform common voltage Vcom to the pixels.

As described above, the embodiment of the invention supplies all of the signals required to drive the display panel through the vertical lines including the vertical data lines, the vertical gate lines, and the vertical common voltage lines, thereby reducing the width of the bezel on each of the left, right, and lower sides of the display panel to about 1.0 mm or less.

The embodiment of the invention time-division supplies the data voltage to the adjacent pixels through one vertical data line, thereby minimizing the number of vertical lines. Further, because the polarity of the data voltage output from the source driver IC is maintained in the same polarity during one frame period, the power consumption and the heat generation amount of the source driver IC may be minimized.

Furthermore, the liquid crystal display according to the embodiment of the invention positions the connection portion between the vertical gate line and the horizontal gate line close to the middle of the display panel as the connection portion is far away from the source driver IC, thereby reducing the deviation of the charge amount of the pixels.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display, comprising:
a display panel including vertical lines, horizontal lines, and pixels; and
a driver integrated circuit (IC) configured to supply a data voltage and a gate pulse to the pixels through the vertical lines,
wherein the vertical lines include vertical data lines to which the data voltage is supplied, vertical gate lines to which the gate pulse is supplied, and vertical common voltage lines to which a common voltage is supplied,
wherein the horizontal lines include horizontal gate lines which are connected to the vertical gate lines via connection portions and receive the gate pulse through the vertical gate lines,
wherein vertical distances between respective connection portions and the driver IC increase as horizontal distances between the respective connection portions and the middle of the display panel decrease,
wherein only one vertical gate line is positioned between a first pixel and a second pixel which are horizontally adjacent each other,
wherein only one vertical data line is positioned between a third pixel and a fourth pixel which are horizontally adjacent each other,
wherein only one vertical common voltage line is positioned between a fifth pixel and a sixth pixel which are horizontally adjacent each other, and
wherein a surrounding common voltage line to which the common voltage is supplied, and at least two ground lines to which a ground level voltage is supplied, are formed in a bezel area outside an area of the pixels, the surrounding common voltage line surrounds three sides of the pixel area and configures to supply the common voltage to the vertical common voltage lines, and the at least two ground lines are disposed at two opposite sides of the pixel area and closer to the pixel area than the surrounding common voltage line.

2. The liquid crystal display of claim 1, wherein one vertical line is positioned between the horizontally adjacent pixels of the display panel, and
wherein a first vertical gate line, a first data line, a second vertical gate line, a second data line, a third vertical gate line, a third data line and a first vertical common voltage line are sequentially disposed every eight pixels arranged on a same horizontal line.

3. The liquid crystal display of claim 2, wherein the number of pixels positioned on one line of the display panel is 'm', where m is a positive integer equal to or greater than 2, the number of vertical lines is 'm',
wherein the number of vertical lines and the number of horizontal lines in the display panel are 'm' and 'n', respectively, where n is a positive integer equal to or greater than 2, and a resolution of a pixel array of the display panel is 'm*n/2'.

4. The liquid crystal display of claim 2, wherein the driver IC includes:

a source driver IC configured to output the data voltage; and a gate driver IC configured to output the gate pulse, wherein both the source driver IC and the gate driver IC are mounted on a chip-on film (COF).

5. The liquid crystal display of claim 4, wherein the source driver IC is configured to supply the data voltage of a first polarity to the odd-numbered vertical data lines and to supply the data voltage of a second polarity to the even-numbered vertical data lines during one frame period, wherein the data voltage supplied to each of the vertical data lines is maintained in one polarity during one frame period, and wherein one of the first and second polarities is positive and the other of the first and second polarities is negative.

6. The liquid crystal display of claim 1, wherein the connection portions between the vertical gate lines and the horizontal gate lines collectively form a V-shape in a plan view of the display panel, a tip of the V-shape being vertically furthest from the driver IC.

7. The liquid crystal display of claim 2, wherein the horizontal lines are formed using gate metal patterns formed on a substrate of the display panel, wherein semiconductor patterns and source-drain metal patterns positioned on the gate metal patterns are stacked to form the vertical lines, wherein a gate insulating layer is formed between the vertical lines and the horizontal lines.

8. The liquid crystal display of claim 7, wherein a first passivation layer and an organic protection layer are stacked on the vertical lines and the gate insulating layer, wherein a common electrode and a link pattern of the pixels formed of a transparent conductive material are formed on the organic protection layer, wherein a second passivation layer is formed on the common electrode and the link pattern, wherein pixel electrodes of the pixels are formed on the second passivation layer, wherein the link pattern connects the vertical gate line to the horizontal gate line through a contact hole, which passes through the organic protection layer and the first passivation layer and exposes the vertical gate line, and a contact hole, which passes through the organic protection layer, the first passivation layer, and the gate insulating layer and exposes the horizontal gate line.

9. The liquid crystal display of claim 1, wherein a width of the bezel area in the display panel is equal to or less than about 1.0 mm.

10. The liquid crystal display of claim 1, wherein a ratio of the number of vertical gate lines to the number of vertical common voltage lines is 3:1 (three to one).

11. A method for manufacturing a liquid crystal display, comprising:

forming vertical lines and horizontal lines crossing the vertical lines on a substrate and forming a plurality of pixels on the substrate to manufacture a display panel; and connecting a driver integrated circuit (IC), which supplies a data voltage and a gate pulse to the pixels through the vertical lines, to the display panel, wherein the vertical lines include vertical data lines to which the data voltage is supplied, vertical gate lines to which the gate pulse is supplied, and vertical common voltage lines to which a common voltage is supplied, wherein the horizontal lines include horizontal gate lines which are connected to the vertical gate lines via connection portions and receive the gate pulse through the vertical gate lines, wherein vertical distances between respective connection portions and the driver IC increase as horizontal distances between the respective connection portions and the middle of the display panel decrease, wherein only one vertical gate line is positioned between a first pixel and a second pixel which are horizontally adjacent each other, wherein only one vertical data line is positioned between a third pixel and a fourth pixel which are horizontally adjacent each other, wherein only one vertical common voltage line is positioned between a fifth pixel and a sixth pixel which are horizontally adjacent each other, and wherein a surrounding common voltage line to which the common voltage is supplied, and at least two ground lines to which a ground level voltage is supplied, are formed in a bezel area outside an area of the pixels, the surrounding common voltage line surrounds three sides of the pixel area and configures to supply the common voltage to the vertical common voltage lines, and the at least two ground lines are disposed at two opposite sides of the pixel area and closer to the pixel area than the surrounding common voltage line.

12. The method of claim 11, wherein one vertical line is positioned between the horizontally adjacent pixels of the display panel, and wherein a first vertical gate line, a first data line, a second vertical gate line, a second data line, a third vertical gate line, a third data line and a first vertical common voltage line are sequentially disposed every eight pixels arranged on a same horizontal line.

13. The method of claim 11, wherein a width of the bezel area in the display panel is equal to or less than about 1.0 mm.

14. The method of claim 11, wherein the connection portions between the vertical gate lines and the horizontal gate lines collectively form a V-shape in a plan view of the display panel, a tip of the V-shape being vertically furthest from the driver IC.

15. A method for manufacturing a liquid crystal display including a display panel including vertical lines, horizontal lines, and pixels and a driver integrated circuit (IC) supplying a data voltage and a gate pulse to the pixels through the vertical lines, the method comprising:

forming the horizontal lines using gate metal patterns formed on a substrate of the display panel;

forming a gate insulating layer on the substrate to cover the horizontal lines;

stacking semiconductor patterns and source-drain metal patterns on the gate insulating layer to form the vertical lines;

stacking a first passivation layer and an organic protection layer on the vertical lines and the gate insulating layer;

forming a common electrode and a link pattern of the pixels formed of a transparent conductive material on the organic protection layer;

forming a second passivation layer on the common electrode and the link pattern; and forming pixel electrodes of the pixels on the second passivation layer, wherein the vertical lines include vertical data lines to which the data voltage is supplied, vertical gate lines to which the gate pulse is supplied, and vertical common voltage lines to which a common voltage is supplied, wherein the horizontal lines include horizontal gate lines which are connected to the vertical gate lines via connection portions and receive the gate pulse through the vertical gate lines, wherein vertical distances between respective connection portions and the driver IC increase as horizontal distances between the respective connection portions and the middle of the display panel decrease, wherein only one vertical gate line is positioned between a first pixel and a second pixel which are horizontally adjacent each other, wherein only one vertical data line is positioned between a third pixel and a fourth pixel which are horizontally adjacent each other, wherein only one vertical common voltage line is positioned between a fifth pixel and a sixth pixel which are horizontally adjacent each other, and wherein a surrounding common voltage line to which the common voltage is supplied, and at least two ground lines to which a ground level voltage is supplied, are formed in a bezel area outside an area of the pixels, the surrounding common voltage line surrounds three sides of the pixel area and configures to supply the common voltage to the vertical common voltage lines, and the at least two ground lines are disposed at two opposite sides of the pixel area and closer to the pixel area than the surrounding common voltage line.

16. The method of claim 15, wherein one vertical line is positioned between the horizontally adjacent pixels of the display panel, and wherein a first vertical gate line, a first data line, a second vertical gate line, a second data line, a third vertical gate line, a third data line and a first vertical common voltage line are sequentially disposed every eight pixels arranged on a same horizontal line.

17. The method of claim 16, wherein the link pattern connects the vertical gate line to the horizontal gate line through a contact hole, which passes through the organic protection layer and the first passivation layer and exposes the vertical gate line, and a contact hole, which passes through the organic protection layer, the first passivation layer, and the gate insulating layer and exposes the horizontal gate line.

18. The method of claim 16, wherein the number of pixels positioned on one line of the display panel is 'm', where m is a positive integer equal to or greater than 2, the number of vertical lines is 'm', wherein the number of vertical lines and the number of horizontal lines in the display panel are 'm' and 'n', respectively, where n is a positive integer equal to or greater than 2, and a resolution of a pixel array of the display panel is 'm*n/2'.

19. The method of claim 15, wherein the connection portions between the vertical gate lines and the horizontal gate lines collectively form a V-shape in a plan view of the display panel, a tip of the V-shape being vertically furthest from the driver IC.

* * * * *